United States Patent [19]

Yamaoki et al.

[11] Patent Number: 4,935,403

[45] Date of Patent: Jun. 19, 1990

[54] RECORDING HEAD AND ITS APPLICATION

[75] Inventors: Toshihiko Yamaoki, Osaka; Kouji Minami, Higashiosaka; Kenichiro Wakisaka, Hirakata; Masayuki Iwamoto, Itami, all of Japan

[73] Assignee: Sanyo Electric Co., Ltd., Moriguchi, Japan

[21] Appl. No.: 267,861

[22] Filed: Nov. 7, 1988

[30] Foreign Application Priority Data

Nov. 13, 1987 [JP] Japan ................................ 62-287703
Nov. 13, 1987 [JP] Japan ................................ 62-287704

[51] Int. Cl.$^5$ ............................................ G01D 15/10

[52] U.S. Cl. ........................................ 505/1; 346/74.5; 346/74.2

[58] Field of Search .................... 346/74.2, 74.3, 74.4, 346/74.5, 74.6, 74.7, 155, 139 C; 505/825, 725, 701, 1

[56] References Cited

U.S. PATENT DOCUMENTS 4,739,342 4/1988 Dove et al. ........................ 346/74.5

*Primary Examiner*—Arthur G. Evans
*Attorney, Agent, or Firm*—Armstrong, Nikaido, Marmelstein, Kubovcik & Murray

[57] ABSTRACT

A recording head comprises a magnetically permeable substrate, a superconducting film formed on one side of said substrate, a means for producing a uniform magnetic field sustantially perpendicular to a surface of the superconducting film, and a means for locally destroying the superconductivity of the superconducting film so as to produce a pattern of normal conducting portions in the area of the superconducting film where the magnetic field is applied. A recording device comprises a recording head for producing a pattern of a magnetic field on a recording medium, a toner supply unit arranged in face-to-face relationship with the recording head at a spaced short distance from the head to form a visible pattern of magnetic toners on the recording medium, and a fixing unit for fixing the magnetic toners on the recording medium to complete a record. When electric signals are applied to the recording head, the superconducting film is locally changed from the superconducting state into the normal conducting state so that the magnetic field applied to the film may penetrate through normal conducting portions of the film to produce a magnetic pattern on the recording medium. Almost simultaneously with the formation of the magnetic dot pattern, a visible powder pattern is directly formed on the recording sheet, and then fixed on thereon by fusion.

22 Claims, 2 Drawing Sheets

RECORDING HEAD AND ITS APPLICATION

FIELD OF THE INVENTION

The present invention relates to a recording head and its application to a recording device for producing a record on a recording medium such as plain paper.

BACKGROUND OF THE INVENTION

As a recording device for producing permanent records on plain paper, there have been known a variety of recording devices including electrophotographic copying machines and thermal transfer printers. Such recording devices are described in patents and other literatures. For example, Japanese patent publication No. 40109/1986 discloses an electrophotographic copying machine employing electrophotography. In the electrophotographic recording, a photosensitive drum is charged with a corona discharger to produce uniform distribution of electrical charges and then exposed to a light pattern to form a latent electrostatic image on a photosensitive surface of the drum, and the latent image is developed with a powder developer into a visible powder image, transferred to a sheet of plain paper, and then fixed thereon by fusing to form a permanent copy.

Japanese patent publication No. 51998/1986 discloses a thermal transfer printer employing a thermosensitive inking tape and an electrothermal head. In this system, an inking tape in contact with the head is locally fused by signal-controlled thermal action of heat-generating elements of the head, and the fused ink is transferred to recording paper to produce a record.

However, the electrophotographic copying machines have complicated mechanisms since various units including a corona discharger, a light exposure unit, a powder developer, and a image transfer unit must be arranged around the photosensitive drum, resulting in a considerable increase in the manufacturing cost. The thermal printers are simplified in construction, but they require use of expensive inking tapes, resulting in increase in the recording cost per unit sheet.

On the other hand, there has been proposed a printer of the kind wherein a multi-element magnetic head is adapted to be in contact with a magnetic recording sheet, and applied with electric image signals to produce a latent pattern of magnetic dots on the recording sheet, and wherein the magnetic dot pattern is developed with a powder developer containing magnetic toners into a visible powder image, transferred to a sheet of plain paper, and then fixed thereon to produce a completed record. Japanese utility model laid-open No. 154515/1976 discloses a multi-element magnetic head for use in such a printer, comprising a plurality of magnetic elements each composed of a magnetic core and magnetic coils wound around each core. In such a recording head, it is required to provide a large number of magnetic elements of the head since the quality of record depends on the number of magnetic dots, or, the number of the magnetic elements of the head. However, the greater the number of dots, the greater is the number of the coils of the recording head, so that the recording head becomes complex to manufacture.

SUMMARY OF THE INVENTION

It is therefore an object of the present invention to provide a recording head which is simple in construction and easy to manufacture.

Another object of the present invention is to provide a recording head which makes it possible to produce a record on either a nonmagnetic recording medium or a magnetic recording medium.

Further object of the present invention is to provide a recording device with a relatively simplified structure that makes it possible to produce a record directly on a recording medium.

Another object of the present invention to provide a recording device for producing a record directly on a recording sheet such as plain paper.

These and other objects are achieved by providing a recording head comprising a magnetically permeable substrate, a superconducting film formed on one side of said substrate, a means for producing a uniform magnetic field substantially perpendicular to a surface of said superconducting film, and a means for locally destroying the superconductivity of said superconducting film so as to produce a pattern of normal conducting portions in the area of the superconducting film where the magnetic field is applied, said pattern corresponding to a pattern to be recorded.

In a preferred embodiment, the means for destruction of superconductivity is composed of a heat-generating film of a electrically resistant material, which is deposited on the superconducting film and subdivided into a plurality of heat-generating islands or pads, to which electric record signals are applied.

In another preferred embodiment, the means for destruction of superconductivity is composed of a laser beam projection system comprising a laser beam source, and a rotating polygon mirror by which the laser beam is scanned on the superconducting film through an f-$\theta$ lens. In this case, the destruction of superconductivity takes place in the area where the laser beam from the source is scanned on the superconducting film of the head.

In still another preferred embodiment, a light emitting diode array is used in combination with a graded index optical fiber lens array as a means for destroying the superconductivity of the superconducting film.

According to the present invention, there is also provided a recording device comprising a recording head for producing a pattern of a magnetic field on a recording medium, said magnetic field being substantially perpendicular to a surface of said recording medium, said pattern of magnetic field corresponding to a pattern of record; a toner supply unit arranged in face-to-face relationship with said recording head at a spaced short distance from the head to form a visible pattern of magnetic toners corresponding said magnetic field pattern on the recording medium, and a fixing unit for fixing the magnetic toners on said recording medium to complete a record.

In another preferred embodiment, the recording device is simplified in construction by removing the toner supply unit and fixing unit and is adapted to produce a record on a magnetic recording medium. Thus, there is also provided a recording device comprising a recording head and a means for supplying a magnetic recording medium to the recording head.

The recording device employing a recording head with a means for destruction of superconductivity composed of a heat-generating film may be operated in the following manner. When no electric signal is applied to the heat-generating islands, the superconducting film is in the superconducting state and the magnetic field applied to the film is prevented from penetrating there-into because of its Meissner effect. When electric signals are applied to the selected heat-generating islands, the islands generate heat so that the superconducting film is locally destroyed in the areas where it is in contact with the islands, and then converted into the normal conducting state. Thus, the magnetic field applied to the superconducting film penetrates through the film and produces a magnetic dot pattern on the face of the head.

Almost simultaneously with the formation of the magnetic dot pattern, the magnetic toners are attracted by magnetic attraction from the toner supply unit to the surface of a traveling recording medium such as plain paper fed by paper feed rollers and form a powder pattern corresponding to the pattern to be recorded. The transition into the superconducting state takes place as soon as the the electric signals applied to the heat-generating islands are stopped. The powder pattern is then fixed on the recording medium with the fixing unit by fusion.

When the recording medium is magnetic, the recording device is simplified by eliminating the toner supply unit and fixing unit. In this case, the recording medium such as a magnetic tape or film passes over the recording head at a constant linear speed and any part of the recording medium crossing the normal conducting area of the head is magnetized and remains in a permanent state of magnetization. Thus, a pattern to be recorded is directly produced in the recording medium.

These and other objects, features and advantages of the present invention will be further apparent from the following description taken in conjunction with the accompanying drawings which show, by way of example only, several preferred embodiments thereof. In the drawings, like numerals indicate like parts throughout.

DESCRIPTION OF THE PREFERRED EMBODIMENT

Figure 1:
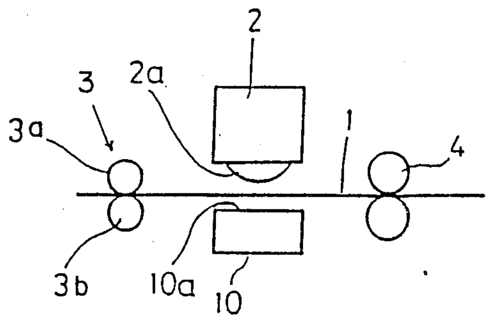
FIG. 1 is a schematic side view of a recording device embodying the present invention.
Figure 2:
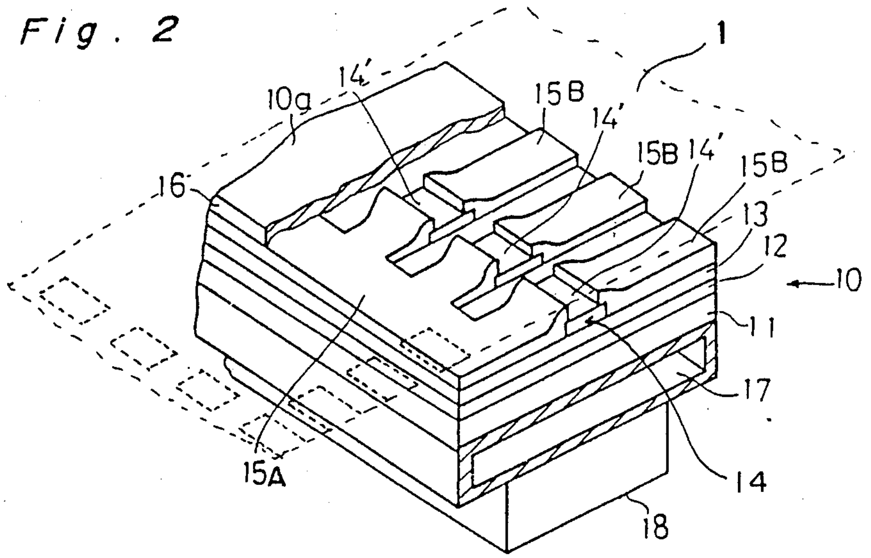
FIG. 2 :s a perspective view of a recording head for use in the recording device of FIG. 1.

Referring now to FIGS. 1 and 2, there is shown a recording device embodying the present invention, which comprises a recording head 10 so arranged that its face 10*a* is parallel to a traveling plane of a recording medium 1 such as plain paper to provide a light sliding contact with the recording medium, a paper feed unit 3 arranged upstream of the recording head 10, a toner supply unit or a developer 2 arranged on the opposite side of the traveling plane from the recording head 10 in face-to-face relationship with the face 10*a* of the head 10 to supply magnetic toners to the recording paper 1, and a fixing unit 4 arranged downstream of the recording head 10.

As illustrated in detail in FIG. 2, the recording head 10 comprises a substrate 11 in the form of a wafer of an insulating material, on which is formed a superconducting film 12. The superconducting film 12 may be made up of any well-known superconducting materials and by the well known thin film-forming technique such as vapor deposition, sputtering and the like. In this embodiment, the superconducting film 12 with a thickness of 0.01 to 100 μm was made on a substrate 11 of a MgO single crystal wafer or a $SrTiO_3$ single crystal wafer with a thickness of 0.1 to 1 mm by the radio-frequency magnetron sputtering process, using a sintered body having a composition $Y_1Ba_2Cu_3O_x$ (x may take any value) as a target. The sputtering was carried out in an atmosphere consisting essentially of argon and oxygen under a pressure of 0.1 Torr, with an electric power of 100W and a frequency of 13.56 MHz. During sputtering, the substrate was maintained at 400° C. After being deposited on the substrate, the resultant film was annealed at a temperature of 930 to 960° C. for 3 to 10 hours in an oxygen atmosphere under a pressure of 1 Torr. The thus prepared superconducting film has a composition $YBa_2Cu_3O_{7-x}$ (where $0.1 \leqq x \leqq 0.5$) and a critical temperature of 80° K.

Deposited on the superconducting film 12 is an insulating film 13 of an electrically insulating material such as $SiO_2$, on which is formed a heat-generating film 14. The heat-generating film is subdivided into a plurality of heat-generating islands or pads 14' in a row extending perpendicular to the traveling direction of the recording paper 1, the heat-generating islands 14' being made up of an electrically resistive material by sputtering, and separated by gaps provided by exposed strips of the insulating film 13. The heat-generating islands 14' are electrically connected, at each one end, to a common terminal or electrode 15A and, at the other end, to individual terminals or electrodes 15B, the electrodes 15A and 15B being of aluminum. The electrodes 15A and 15B and heat-generating islands 14' are covered with a wear resistant film 16 of a thickness of 10 μm of a wear resistant material, suitably $Ta_2O_3$. The surface of the wear resistance film 16 serves as the head face 10*a*.

The heat-generating islands 14' are so designed that each island generates heat sufficient to heat a part of the superconducting film 12 in the area located just below to a temperature above the critical temperature thereof so as to destroy the superconductivity as well as to bring it to the normal conducting state. In this embodiment, the heat-generating islands 14' have a thickness of 0.1 μm, a surface area of 100 μm×70 μm, and a resistance of 600 Ω, and a pulse voltage with a peak voltage of 15 volts and a pulse width of 0.1 to 1 millisecond is applied to each island 14' as the electric signals.

Mounted on the opposite side of the substrate 11 from the superconducting film 12 is a duct 17 with a rectangular cross section, on which is mounted a permanent magnet 18 to provide a magnetic field substantially perpendicular to the surface of the superconducting film 12 and the face 10*a* of the head 10 at least in the areas where the resistive islands 14' are formed in a row. The duct 17 is made up of a magnetically permeable material such as, for example, aluminum to allow the magnetic field to penetrate into the superconducting film 12, and it is connected to a means for circulating a coolant such as liquid nitrogen.

The toner supply unit 2 comprises a rotating cylindrical sleeve 2*a* which is arranged on the opposite side of the recording paper from the head 10 in face-to-face relationship with the recording head 10 at a spaced short distance. The toner supply unit 2 may be the one conventionally employed in electrophotographic copying machines as a powder developer, for example, a magnetic brush developing devices comprising a magnetized roller which attracts the magnetic toners forming rotating magnetic brushes.

The paper feed unit 3 includes a pair of feed rollers 3*a* and 3*b* arranged upstream of the recording head 10. The fixing unit 4 comprises a pair of rollers 4 arranged downstream of the recording head. The paper feed unit 3 and fixing unit 4 may be the ones conventionally employed in the electrophotographic recording devices.

The thus constructed recording device is operated in the following manner: The coolant or liquid nitrogen is fed to the duct 17 of the recording head so that the superconducting film 12 situated in the magnetic field is cooled into a superconducting state. Under such a condition, a recording medium, for example, a sheet of plain paper 1 is fed to the recording zone between the head 10 and the magnetic toner supply unit 2 by the paper feed rollers 3*a* and 3*b*.

When no electric signal corresponding to the pattern to be recorded is applied to the recording head 10, the superconducting film 12 is kept in the superconducting state. Thus, the magnetic field from the permanent magnet 18 is prevented from penetrating into the superconducting film 12 because of the Meissner effect, and no magnetic attractive force is applied to the magnetic toners in the toner supply unit 2.

When electric signals corresponding to dots which form a pattern of a record are applied to the recording head 10, the applied heat-generating islands 14' generate heat, so that a part or parts of the superconducting film 12 in the areas just below the islands 14' are locally heated and brought into the normal conducting state. Thus, the magnetic field from the permanent magnet 18 penetrates through the normal conducting areas of the superconducting film 12 in the direction substantially perpendicular to the film and produces a pattern of the magnetic field on the face of the head 10. The produced magnetic field distribution corresponds to the pattern to be recorded.

Simultaneously with production of the magnetic field pattern, the toners are attracted by the magnetic attraction to the surface of the traveling plain paper 1 which is in sliding contact with the recording head 10 and travels past the toner supply unit 2 close enough to provide light brushing contact, so that a visible powder pattern is formed on the plain paper 1 as illustrated in FIG. 2 with broken lines. The production of the magnetic field pattern and its development are finished simultaneously with the termination of the pulse voltage, and the superconducting film 12 is returned to the superconducting state with the termination of the pulse voltage.

The powder pattern is then fixed on the plain paper by the fixing unit 4 during passing therethrough to complete the record.

As will be understood from the above, in the recording device of the present invention, a latent magnetic field pattern corresponding to a pattern to be recorded is formed on the paper, directly developed into a visible powder pattern simultaneously with its formation, and then fixed thereon. This makes it possible to produce record directly on plain paper without transfer of the developed pattern to the recording paper.

In the above embodiment, the heat-generating film 14 has been used as a means for destroying the superconductivity of the superconducting film. However, many variations may be possible as mentioned below.

Figure 3:
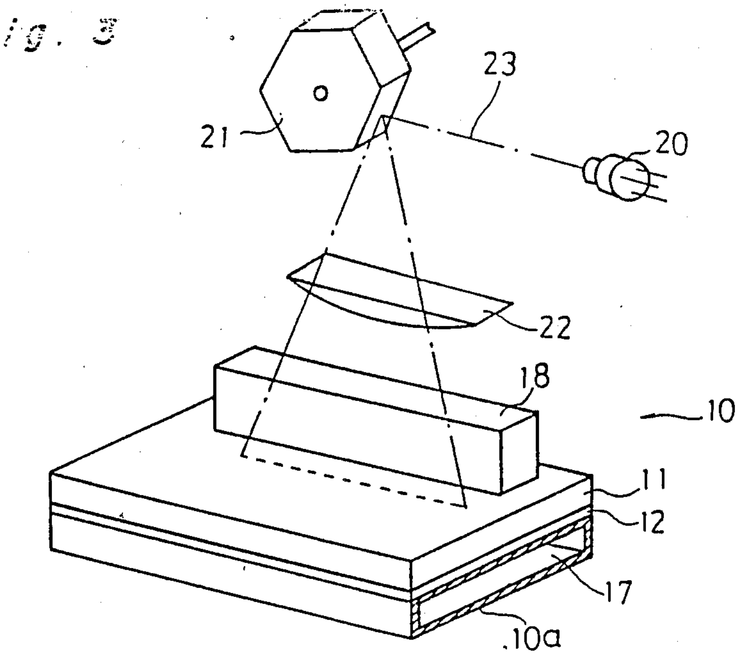
FIG. 3 is a perspective bottom view showing another form of a recording head for use in the recording device of FIG. 1.

Referring now to FIG. 3, there is shown another form of a recording head embodying the present invention. The recording head 10 comprises a superconducting film 12 provided on an insulating substrate 11 of MgO, a duct 17 forming a face 10*a* of the recording head 10 and being in contact with the superconducting film 12, and a permanent magnet 18 mounted on the opposite side of the substrate 11 from the superconducting film 12 to produce a magnetic field perpendicular to the face 10*a* of the head 10. A means for destruction of the superconductivity comprises a source 20 of laser beam 23 with a wave length of about 780 nm, a polygon mirror 21, and f-$\theta$ lens 22. The polygon mirror 21 is rotated to scan the laser beam 23 on the superconducting film 12 in the direction parallel to the elongated side of the permanent magnet 18.

In use, when the laser beam 23 is radiated on the surface of the superconducting film 12, the superconducting film is locally heated to a temperature above the critical temperature, so that the area where the laser beam is applied becomes normal. The normal conducting area of the film 12 is then returned to the superconducting state when the radiation of laser beam is removed. By driving the laser beam source 20 in synchronized relationship with the rotation of polygon mirror in accordance with the record pattern, the magnetic field penetrates through the normal conducting areas of the superconducting film 12 and produces a pattern of magnetic field corresponding to the pattern to be recorded on the surface of the recording paper 1 which is in contact with the face 10*a* of the recording head 10. This magnetic field pattern is developed with the toner supply unit 2 and then fixed on the paper with the fixing unit 4 in the same manner as the embodiment of FIGS. 1 and 2.

Figure 4:
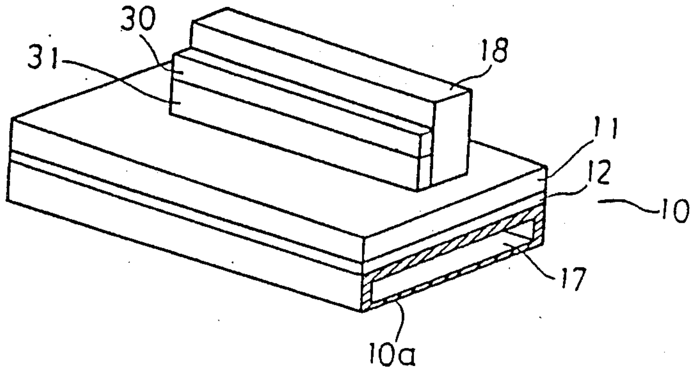
FIG. 4 is a perspective bottom view showing another form of a recording head for use in the recording device of FIG. 1.

FIG. 4 shows still another form of a recording head for use in a recording device embodying the present invention. In this, a means for destruction of superconductivity comprises a light emitting diode array 30 arranged along the longitudinal side of a permanent magnet 18, and a graded index optical fiber lens array 31 arranged between the light emitting diode array 30 and substrate 11 to direct the light rays from the diode array 30 to the superconducting film 12.

In use, the individual diodes of the array 30 are turned on by electric signals in accordance with dots of the record pattern. The light rays emitted from the array are radiated to a part of the superconducting film, so that the areas of the superconducting film, receiving the light rays, are heated and change from the superconducting state into the normal conducting state. For this reason, the magnetic field from the permanent magnet penetrates through the normal conducting areas of the superconducting film 12 and produces a magnetic field pattern on the face 10*a* and the recording medium.

The above superconductivity destruction means may be modified in various ways. For example, the laser source in FIG. 3 or light emitting diode array in FIG. 4 may be replaced with the one radiating infrared rays. Since the infrared rays are effective to destroy the Cooper's electron pairs of the superconductor, the radiation of infrared rays causes rapid transition from the superconducting state into the normal state as compared with the application of heat, thus making it possible to improve the responsibility of the recording head. Thus, the use of infrared rays is effective to produce a record at high speed.

Further, the recording head illustrated in FIG. 4 may be modified by replacing the diode array 30 with a fluorescent lamp or halogen lamp and replace the lens array 31 with a liquid crystal shutter element.

In the foregoing embodiments, the superconducting film for the recording head has been made up of a composition of $YBa_2Cu_3O_{7-x}$ (where $0.1 \leqq x \leqq 0.5$) with a critical temperature of 80° K. It is, however, possible to use any other superconducting materials for this purpose. For example, the superconducting film may be made up of a composition of a Bi-Sr-Ca-Cu-O system. In fact, such a superconducting film was prepared in the following manner: Using a sintered body of $Bi_1Sr_1Ca_1Cu_2O_x$ (x may take any value) as a target, the superconducting film 12 with a thickness of 0.01 to 100 μm was formed on a MgO or $SrTiO_3$ single crystal wafer with a thickness of 0.1 to 1 mm by the radio-frequency magnetron sputtering. The sputtering was carried out in an atmosphere consisting essentially of argon and oxygen under a pressure of 0.1 torr, with an electric power of 100W having a frequency of 13.56 MHz. During sputtering, the substrate was maintained at a temperature of not more than 400° C. After being deposited on the substrate, the resultant film was annealed in air at a temperature of 850 to 890° C. for 3 to 10 hours. The thus prepared superconducting film has a composition expressed by the formula: $BiSrCaCu_2O_{7-x}$ (where $0.1 \leqq x \leqq 0.5$) and a critical temperature of 110° K.

In another embodiment, the superconducting film 12 of a Bi-Sr-Ca-Cu-O system was prepared in the following any value) as a target, a superconducting film with a thickness of 0.01 to 100 μm was formed on a MgO or $SrTiO_3$ single crystal wafer with a thickness of 0.1 to 1 mm by the radiofrequency magnetron sputtering. The sputtering was carried out in an atmosphere consisting essentially of argon and oxygen under a pressure of 0.1 torr, by applying an electric power of 100W with a frequency of 13.56 MHz to the target. During sputtering, the substrate was maintained at a temperature ranging from 650 to 700° C. After being deposited on the substrate, the resultant film was annealed in an oxygen atmosphere under 1 Torr at a temperature of 450 ° C. for 3 hours. The thus prepared superconducting film has a composition expressed by the formula: $BiSrCaCu_2O_{7-x}$ (where $0.1 \leqq x \leqq 0.5$) and a critical temperature of 110° K.

If the superconducting film be made up of a superconducting material showing the critical point at normal temperature, there is no need to use liquid nitrogen as the coolant for the superconducting film.

In the foregoing embodiments, the recording device requires provision of a toner supply unit and a fixing unit, but the device may be simplified in construction by eliminating these units therefrom. In this case, the recording device is operated in combination with a magnetic recording medium such as magnetic tapes, magnetic films and like.

Such a recording device comprises a recording head 10, and a transport system that provides a constant linear speed in moving the magnetic recording medium over the recording head. The recording head is arranged so that its face 10*a* is parallel to a traveling plane of the magnetic recording medium 1 to provide a light sliding contact with the recording medium. The transport system is arranged downstream of the recording head 10 in place of the fixing unit 4 employed in FIG. 1. The toner supply unit 2 in FIG. 1 is eliminated from the device. The recording head may be any one of those illustrated in FIGS. 2 to 4, and the transport system may be composed of a capstan and a pinch roller commonly employed in magnetic recorders.

In use, the magnetic recording tape or film is pulled over the face of the recording head 10 and an electrical signal is supplied to the recording head to cause a local transition from the superconducting state to the normal conducting state. The magnetic field from the permanent magnet 18 penetrates through the normal conducting areas of the superconducting film 12, so that a pattern of magnetic flux is generated in the recording head and induced into the magnetic recording medium. Thus, the recording is made directly on the recording medium.

What is claimed is:

1. A recording head comprising:
- a magnetically permeable substrate;
- a superconducting film formed on one side of said substrate;
- means for producing a uniform magnetic field substantially perpendicular to a surface of said superconducting film; and
- means for locally neutralizing superconductivity of said film such that the magnetic field from said magnetic field producing means locally passes through said superconducting film to form a pattern of the magnetic field, which corresponds to a pattern to be recorded, on recording medium when recording a pattern on said recording medium.

2. A recording head as claimed in claim 1 wherein said means for producing a uniform magnetic field includes a permanent magnet.

3. A recording head as claimed in claim 1 further comprising a magnetically permeable duct connected to a means for circulating a coolant to keep said superconducting film in a superconducting state.

4. A recording head claimed in claim 1 wherein said means for locally neutralizing superconductivity of said film includes a heat generating film deposited on the superconducting film and subdivided into a plurality of heat-generating islands.

5. A recording head as claimed in claim 1 wherein said means for locally neutralizing superconductivity of said film includes a laser beam projection system having a laser beam source, and a rotating polygon mirror by which the laser beam is scanned on the superconducting film.

6. A recording head as claimed in claim 1 wherein said means for locally neutralizing superconductivity of said film includes a light projection system having a light emitting diode array and a fiber-optic lens array arranged on said substrate.

7. A recording head as claimed in claim 1 wherein said means for locally neutralizing superconductivity of said film includes a means for radiating infrared rays on the superconducting film.

8. A recording head, having a head positioned opposite to a recording medium, for recording a desired pattern on said recording medium, comprising:
- a magnetically permeable substrate;
- a superconducting film formed on one side of said substrate;
- means for producing a uniform magnetic field substantially perpendicular to a surface of said superconducting film, said means for producing the magnetic field being positioned opposite to the head face such that the superconducting film is interposed between the magnetic field producing means and the head face to prevent the magnetic field from passing through to a recording medium; and means for locally neutralizing superconductivity of said film to allow the magnetic field from said magnetic field producing means to locally pass through said superconducting film to form a pattern of the magnetic field, which corresponds to a pattern to be recorded, on a recording medium when recording a pattern on said recording medium.

9. A recording head comprising:

a magnetically permeable substrate;

a superconducting film formed on one side of said substrate;

means for producing a uniform magnetic field substantially perpendicular to a surface of said superconducting film, said means for producing the magnetic field being arranged on the opposite side of said substrate to prevent the magnetic field from passing through to a recording medium; and means for locally neutralizing superconductivity of said film to allow the magnetic field from said magnetic field producing means to locally pass through said superconducting film to form a pattern of the magnetic field, which corresponds to a pattern to be recorded, on recording medium when recording a pattern on said recording medium.

10. A recording head comprising:

a magnetically permeable substrate in the form of a wafer;

a superconducting film formed on one side of said substrate;

an elongated permanent magnet arranged on the opposite side of said substrate to produce a uniform magnetic field perpendicular to a surface of said superconducting film;

a duct for circulating a coolant, said duct being arranged on one side of said superconducting film to cool said film into a superconducting state; and means for locally neutralizing super conductivity of the superconducting film to allow the magnetic field from said permanent magnet to locally pass through to a recording medium and thereby to create a magnetic pattern, which corresponds to a pattern of an image to be recorded, on recording medium when recording a pattern on the recording medium.

11. A recording head as claimed in claim 10 wherein said means for locally neutralizing superconductivity of the superconducting film includes a heat-generating film formed on said superconducting film and electrically insulated therefrom by an insulating film between said heat generating film and said superconducting film, said heat generating film being subdivided into a plurality of heat-generating islands, said heat-generating islands being electrically connected to a common terminal or individual terminals to generate heat sufficient to heat a part of the superconducting film to a temperature at which the superconductivity of said superconducting film is neutralized thereby allowing the magnetic field from the permanent magnet to pass through to the recording medium.

12. A recording head as claimed in claim 10 wherein said means for locally neutralizing superconductivity of said film includes a laser beam projection system having a laser beam source, a rotating polygon mirror, and means for driving said mirror to scan the laser beam on said superconducting film through a lens.

13. A recording head as claimed in claim 12 wherein said laser beam source radiates infrared rays.

14. A recording head as claimed in claim 10 wherein said means for locally neutralizing superconductivity of said film includes a light emitting diode array arranged along a longitudinal side of said diode array and said substrate to direct light rays from the diode array to the superconducting film.

15. A recording head claimed in claim 14 wherein said light emitting diode array radiates infrared rays.

16. A recording device for producing a record on a recording medium, comprising:

a recording head positioned so that its recording face is parallel to a traveling plane of a recording medium for producing a pattern of a magnetic field on said recording medium;

a toner supply unit arranged in operative relationship with said recording head at a short distance from the recording face of a said recording head to supply toner on the surface of said recording medium; and a fixing unit for fixing the magnetic toner on said recording medium, said recording head including a magnetically permeable substrate, a superconducting film fomed on one side of said substrate, means for producing a uniform magnetic field substantially perpendicular to a surface of said superconducting film, and means for locally neutralizing superconductivity of said film to produce a pattern of conducting portions corresponding to a pattern to be recorded, which allows the magnetic field from said means for producing magnetic field to pass through said superconducting film when an image is to be created on said recording medium.

17. A recording device for producing a record on a recording medium, comprising:

a recording head positioned so that its recording face is parallel to a traveling plane of a recording medium to produce a pattern of a magnetic field on said recording medium;

a toner supply unit arranged in operative relationship with said recording head at a short distance from the recording face of said recording head to supply toner on the surface of said recording medium; and a fixing unit for fixing the magnetic toner on said recording medium, said recording head having a magnetically permeable substrate, a means for producing a uniform magnetic field substantially perpendicular to a surface of said superconducting film, said means for producing the magnetic field located opposite to the recording head so that the superconducting film is interposed between said magnetic field producing means and said recording head to prevent the magnetic field from passing through to a recording medium when an image is not to be created, and a means for locally neutralizing superconductivity of said film to produce a pattern of normal conducting portions corresponding to a pattern to be recorded, which allows the magnetic field from said means for producing the magnetic field to pass through said superconducting film when an image is to be created onto said recording medium.

18. A recording device for producing a record on a recording medium, comprising:

a recording head positioned so that its recording face is parallel to a traveling plane of a recording medium to produce a pattern of a magnetic field on said recording medium;

a toner supply unit arranged in operative relationship with said recording head at a short distance from the recording face of said recording head to supply toner on the surface of said recording medium; and a fixing unit for fixing the magnetic toners on said recording medium, said recording head including (a) a magnetically permeable substrate, (b) a superconducting film formed on one side of said substrate, (c) means for producing a uniform magnetic field substantially perpendicular to a surface of said superconducting film, said means for producing the magnetic field being arranged on the opposite side of said substrate so that the magnetic field therefrom is prevented by said superconducting film from passing through to a recording medium when an image is not to be created; and (d) means for locally neutralizing superconductivity of said film to produce a pattern of normal conducting portions corresponding to a pattern to be recorded, which allows the magnetic field from said means for producing the magnetic field to pass through said superconducting film when an image is to be created onto said recording medium.

19. A recording device as claimed in claim 16 wherein said means for locally neutralizing superconductivity of said film comprises a heat generating film deposited on the superconducting film and subdivided into a plurality of heat-generating islands.

20. A recording device as claimed in claim 16 wherein said means for locally neutralizing superconductivity of said film includes a laser beam projection system having a laser beam source, and a rotating polygon mirror by which the laser beam is scanned on the superconducting film.

21. A recording device as claimed in claim 16 wherein said means for locally neutralizing superconductivity of said film includes a light projection system having a light emitting diode array and a fiber-optic lens array arranged on said substrate.

22. A recording device as claimed in claim 16 wherein said means for locally neutralizing superconductivity of said film includes a means for radiating infrared rays on the superconducting means.

* * * * *

UNITED STATES PATENT AND TRADEMARK OFFICE

CERTIFICATE OF CORRECTION

PATENT NO. : 4,935,403

DATED : June 19, 1990

INVENTOR(S) : YAMAOKI et al

It is certified that error appears in the above-identified patent and that said Letters Patent is hereby corrected as shown below:

Column 10, line 6, "said diode array" should read --said permanent magnet, and a lens array arranged between said diode array--;

line 25, "fomed" should read --formed--;

line 49, "substrate, a means" should read --substrate, a superconducting film formed on one side of said substrate, a means--;

line 53, "so that the" should read --so that said--.

Signed and Sealed this

Sixth Day of August, 1991

*Attest:*

HARRY F. MANBECK, JR.

*Attesting Officer*

*Commissioner of Patents and Trademarks*